US012257513B2

United States Patent
Shindo et al.

(10) Patent No.: US 12,257,513 B2
(45) Date of Patent: *Mar. 25, 2025

(54) GAMIFICATION OF HEALTH AWARENESS BASED ON A WAKE-UP TIME

(71) Applicant: The Pokémon Company, Tokyo (JP)

(72) Inventors: Takayuki Shindo, Tokyo (JP); Satoshi Ogawa, Tokyo (JP); Kaname Kosugi, Tokyo (JP); Marie Shuto, Tokyo (JP); Koya Nakahata, Tokyo (JP)

(73) Assignee: The Pokémon Company, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/434,858

(22) Filed: Feb. 7, 2024

(65) Prior Publication Data

US 2024/0173630 A1 May 30, 2024

Related U.S. Application Data

(63) Continuation of application No. 17/989,715, filed on Nov. 18, 2022, now Pat. No. 11,944,908, which is a
(Continued)

(30) Foreign Application Priority Data

Sep. 21, 2018 (JP) .................. 2018-176958

(51) Int. Cl.
*A63F 13/825* (2014.01)
*A63F 13/212* (2014.01)
(Continued)

(52) U.S. Cl.
CPC .......... *A63F 13/825* (2014.09); *A63F 13/212* (2014.09); *A63F 13/35* (2014.09);
(Continued)

(58) Field of Classification Search
CPC .......... A63F 13/42; A63F 13/65; A63F 13/69; A63F 13/825; A61B 5/4812
See application file for complete search history.

(56) References Cited

U.S. PATENT DOCUMENTS 10,401,799 B2 * 9/2019 Kusuda ............ H04M 1/72451
11,013,985 B2 * 5/2021 Nishimura .............. A63F 13/70
(Continued)

FOREIGN PATENT DOCUMENTS

JP     H10-48363 A    2/1998
JP    2004-005832 A    1/2004
(Continued)

OTHER PUBLICATIONS

International Search Report and Written Opinion mailed on Dec. 10, 2019, received for PCT Application PCT/JP2019/036821, Filed on Sep. 19, 2019, 13 pages.
Notice of Reasons for Refusal issued Aug. 3, 2022, in Japanese Application No. 2020-041392.
Office Action issued on Dec. 1, 2023, in corresponding Japanese patent Application No. 2023-102893, 5 pages.

*Primary Examiner* — William H McCulloch, Jr.
*Assistant Examiner* — Ankit B Doshi
(74) *Attorney, Agent, or Firm* — XSENSUS LLP

(57) ABSTRACT

An object is to provide a user with motivation to enjoy waking up in the morning and guide the user to sufficient awakening by generating a breeding event in a breeding game of a virtual life form when the user wakes up in the morning. A game server that manages progress of a breeding game of a virtual life form can provide a user with motivation to enjoy waking up in the morning and guide the user to sufficient awakening by generating a breeding event in a breeding game of a virtual life form when the user wakes up in the morning. The game server includes circuitry configured to acquire a wake-up time of a user; and a update the breeding game in accordance with the acquired wake-up time.

5 Claims, 11 Drawing Sheets

Related U.S. Application Data continuation of application No. 17/206,180, filed on Mar. 19, 2021, now Pat. No. 11,534,695, which is a continuation of application No. PCT/JP2019/036821, filed on Sep. 19, 2019.

(51) Int. Cl.
*A63F 13/35* (2014.01)
*A63F 13/65* (2014.01)
*A63F 13/69* (2014.01)
*G06F 9/4401* (2018.01)

(52) U.S. Cl.
CPC .............. *A63F 13/65* (2014.09); *A63F 13/69* (2014.09); *G06F 9/4418* (2013.01)

(56) References Cited

U.S. PATENT DOCUMENTS

2016/0086500 A1* 3/2016 Kaleal, III ............... A61B 5/43
434/257
2017/0136348 A1* 5/2017 Hattori .................. A61B 5/742

FOREIGN PATENT DOCUMENTS

| JP | 2016-49237 A | 4/2016 |
| JP | 2018-013387 A | 1/2018 |
| JP | 2019-111182 A | 7/2019 |
| WO | 2016/021235 A1 | 2/2016 |

* cited by examiner

GAMIFICATION OF HEALTH AWARENESS BASED ON A WAKE-UP TIME

CROSS-REFERENCE TO RELATED APPLICATIONS

This is a continuation of U.S. patent application Ser. No. 17/989,715, filed on Nov. 18, 2022, which is a continuation of U.S. patent application Ser. No. 17/206,180, filed on Mar. 19, 2021 (now U.S. Pat. No. 11,534,695), which is a bypass continuation of PCT Application No. PCT/JP2019/036821, filed on Sep. 19, 2019, which claims priority to Japanese Patent Application No. 2018-176958, filed on Sep. 21, 2018, the entire contents of each are incorporated herein by its reference.

TECHNICAL FIELD

The present disclosure relates to a game server, a program, a method, a game system, and an information processing terminal.

BACKGROUND

Recently, there are techniques for raising a user's awareness of health care by causing the user to continuously check measured health information. For example, PTL 1 describes executing game processing in conjunction with a state related to sleep of a user to cause the user to continuously check results of measurement and analysis related to sleep.
[PTL 1] WO 2016/021235

SUMMARY

Technical Problem

For the purpose of health care, it is important to continuously practice a well-regulated lifestyle of waking up in the morning and going to bed at night at fixed times of day. Generally, in order to wake up at a fixed time of day, an alarm device adopting a mode where an alarm function is added to a clock is used. However, with an alarm device adopting such a mode, it is difficult to guide a user to awake in a smooth manner and the user is not provided with motivation to wake up in the morning.

In addition, since the description in PTL 1 is limited to reflecting parameters based on information on sleep itself such as a sleep time and a quality of sleep onto a game, the features described in PTL 1 hardly provide motivation to wake up in the morning.

The present disclosure has been made in consideration of the problems described above and an object thereof is to provide a game server, a program, a method, a game system, and an information processing terminal for managing progress of a breeding game of a virtual life form which can provide a user with motivation to enjoy waking up in the morning and guide the user to sufficient awakening by generating a breeding event in the breeding game when the user wakes up in the morning.

Solution to Problem

In order to achieve the object described above, a game server according to the present disclosure is a server that manages progress of a breeding game of a virtual life form, the game server including: an acquiring unit which acquires a wake-up time of a user; and a processing unit which executes processing related to the breeding game in accordance with the acquired wake-up time.

In addition, in order to achieve the object described above, a program according to the present disclosure is a program that manages progress of a breeding game of a virtual life form, the program causing a computer to function as: an acquiring unit which acquires a wake-up time of a user; and a processing unit which executes processing related to the breeding game in accordance with the acquired wake-up time.

Furthermore, in order to achieve the object described above, a method according to the present disclosure is a method of managing progress of a breeding game of a virtual life form, the method including the steps of: acquiring a wake-up time of a user; and executing processing related to the breeding game in accordance with the acquired wake-up time.

In addition, in order to achieve the object described above, a game system according to the present disclosure is a system in which a game server that manages progress of a breeding game of a virtual life form and a user terminal are connected to each other via a network, wherein the game server includes: an acquiring unit which acquires a wake-up time of a user; and a processing unit which executes processing related to the breeding game in accordance with the acquired wake-up time.

Furthermore, in order to achieve the object described above, an information processing terminal according to the present disclosure is an information processing terminal that executes a breeding game of a virtual life form, the information processing terminal including: an acquiring unit which acquires a wake-up time of a user; and a processing unit which executes processing related to the breeding game in accordance with the acquired wake-up time.

According to the present disclosure, a user can be provided with motivation to enjoy waking up in the morning and the user can be guided to sufficient awakening.

DETAILED DESCRIPTION

Hereinafter, embodiments of the present disclosure will be described with reference to the drawings. In all of the diagrams for explaining the embodiments, common components will be denoted by same reference signs and repetitive descriptions will be omitted. It is to be understood that the following embodiments do not unduly restrict the contents of the present disclosure as set forth in the scope of claims. In addition, not all components described in the embodiments are essential components of the present disclosure.

First Embodiment

Figure 1:
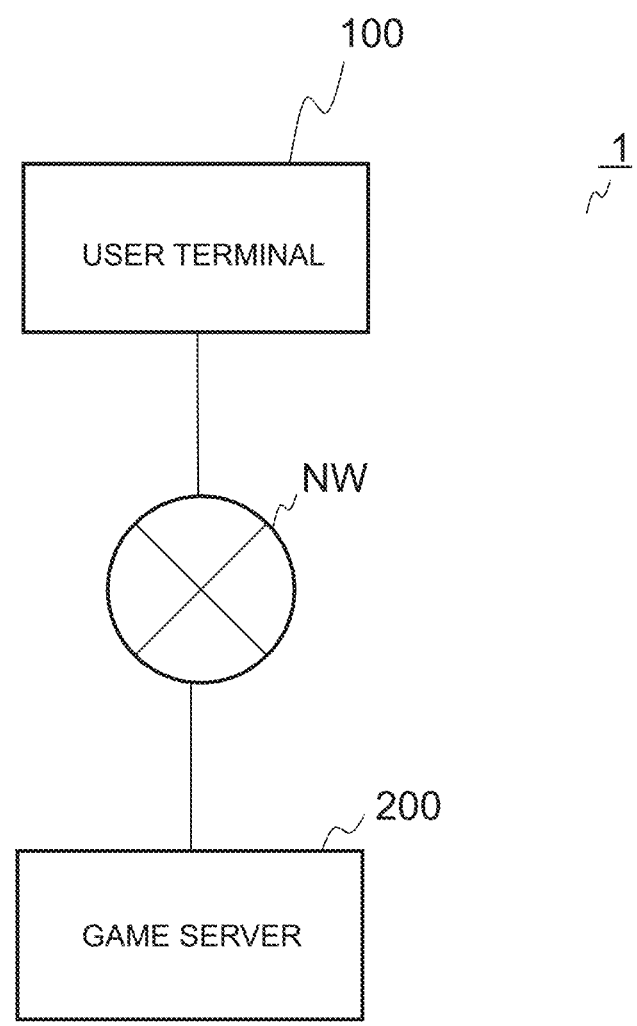
FIG. 1 is a configuration diagram of a game system 1.

FIG. 1 is a configuration diagram of a game system 1. A configuration of the game system 1 according to the first embodiment will be described with reference to FIG. 1.

The game system 1 includes a user terminal 100 and a game server 200 which are connected to be capable of communicating with each other via a network NW. The network NW is constituted by a WAN (Wide Area Network), a LAN (Local Area Network), or the like.

While only one user terminal 100 is shown in FIG. 1, in the present embodiment, the game system 1 includes a plurality of user terminals 100 of which each is provided for each user. The game system according to the present embodiment provides a user with motivation to enjoy waking up in the morning and guides the user to sufficient awakening by generating a breeding event in a breeding game of a virtual life form when the user wakes up in the morning.

The user terminal 100 detects a wake-up time of the user and transmits the wake-up time to the game server 200. A wake-up time represents a time of day at which the user awakes and may be, for example, a time of day at which the user gets out of bed or a time of day at which the user's consciousness makes a transition from a state of sleep to an awakened state.

The game server 200 is a game server that manages progress of a breeding game of a virtual life form and provides a game service of breeding a virtual life form in accordance with a request from the user terminal 100. For example, the game server 200 delivers a game program to the user terminal 100 having accessed the game server 200 via the network NW and the game program is executed on the user terminal 100. The user terminal 100 having executed the game program transmits the wake-up time of the user and the user's input with respect to the breeding game to the game server 200.

The game server 200 acquires the wake-up time from the user terminal 100 and stores the wake-up time as a sleep history. In addition, the game server 200 executes processing steps related to the breeding game based on a wake-up time based on the sleep history and the acquired wake-up time, and transmits information related to the progress of the breeding game to the user terminal 100.

As described above, in the present embodiment, the user terminal 100 detects a wake-up time of the user and transmits the wake-up time to the game server 200. In addition, the game server 200 executes processing steps related to the breeding game based on the wake-up time and transmits a processing result to the user terminal 100. In other words, due to a breeding game that uses a wake-up time of the user as game input, the user can enjoy waking up in the morning and obtain sufficient awakening.

Figure 2:
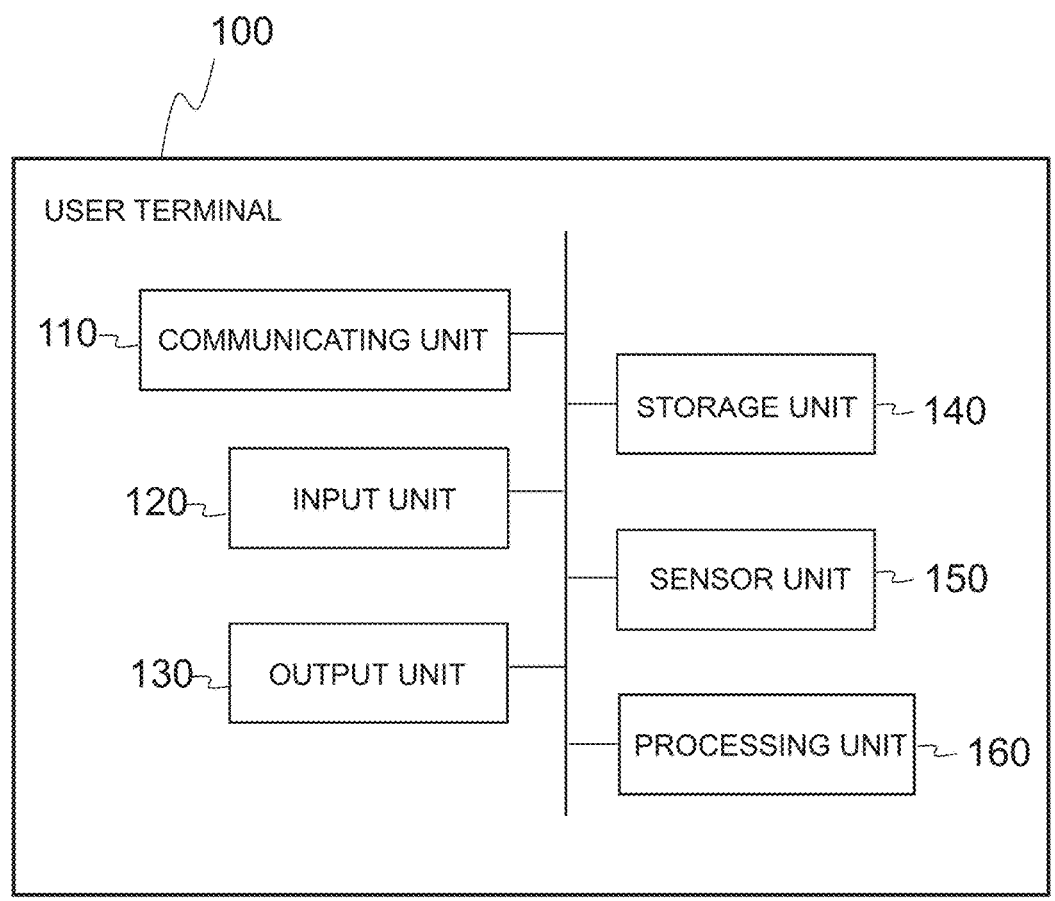
FIG. 2 is a functional block diagram showing an example of a functional configuration of a user terminal 100.

FIG. 2 is a functional block diagram showing an example of a functional configuration of the user terminal 100. Alternatively, the user terminal 100 according to the present embodiment may be configured by omitting a part of components (respective units) shown in FIG. 2.

The user terminal 100 is an information processing apparatus and, in the present embodiment, the user terminal 100 is, for example, a smartphone, a feature phone, a tablet computer, a laptop computer, a desktop computer, a portable game machine, a stationary game machine, a wearable terminal such as a head-mounted display, or a multifunctional device such as a multifunctional television receiver (a smart television) equipped with an information processing function.

In other words, the user terminal 100 has various functions (for example, an input function, an output (display) function, an information processing function, a network communication function, a sensor function, a call function, and a camera function) which are included in a general multifunctional device.

The network communication function is a function that enables communication via the Internet or the like and/or a function that enables communication via a mobile communication network. The user terminal 100 may be realized by installing a predetermined function in an existing multifunctional device. In the present embodiment, in addition to being used as the multifunctional device described above, the user terminal 100 is used to detect the wake-up time described above and to execute the breeding game described above.

The user terminal 100 includes a communicating unit 110, an input unit 120, an output unit 130, a storage unit 140, a sensor unit 150, and a processing unit 160.

The communicating unit 110 performs various kinds of control for communicating with the game server 200 via the network NW and a function thereof can be realized by hardware such as various kinds of processors or a communication ASIC or by a program or the like.

The input unit 120 is an interface for accepting an input from the user and sends the user's input to the processing unit 160. For example, the input unit 120 can be one or more of a touch panel, a button, a microphone, and a controller. Alternatively, sensing data having been detected by the sensor unit 150 to be described later may be used as an input by the user. The user can perform an input to the breeding game via the input unit 120.

The output unit 130 is, for example, a display apparatus such as a display and/or an audio output apparatus such as a speaker, and displays and/or outputs various kinds of images or audio generated by the user terminal 100 in accordance with an input with respect to the input unit 120 or displays or outputs various kinds of images or audio based on data received from the game server 200. The output unit 130 includes an artificial intelligence-mounted speaker (a smart speaker).

In addition, the output unit 130 may include an announcement function for prompting the user to wake up using a sound (such as an alarm), light, vibration, or the like. For example, when a set time arrives or the set time approaches, the output unit 130 may output a call or a motion (vibration) of the virtual life form or output light suggestive of the virtual life form. Alternatively, the output unit 130 may output a call of a virtual life form that differs from the virtual life form being bred by the user or music related to an item or the like so as to build up expectations of the user toward the progress of the game. Accordingly, the user can be motivated to wake up in the morning.

The storage unit 140 is a storage apparatus for storing a program and various kinds of data that cause a computer to function. The storage unit 140 may include a temporary storage area or a storage.

The sensor unit 150 represents various kinds of devices that detect various states of the user terminal 100. For example, the sensor unit 150 can be one or more of an altitude sensor (an acceleration sensor or a gyroscope sensor) that detects an altitude or an inclination of the terminal itself, an eye-gaze sensor that detects a direction of a line of sight of the user, a photosensor that detects peripheral brightness, and an infrared sensor that detects a motion of the user. Alternatively, or additionally, the sensor unit 150 may be one or more of a microphone that collects sound in the periphery of the user terminal 100, a humidity sensor that detects humidity in the periphery of the user terminal 100, a geomagnetic sensor that detects a magnetic field at a location where the user terminal 100 resides, and the like.

The sensor unit 150 may be configured to detect various kinds of information using the sensor functions described above. For example, the sensor unit 150 may detect the number of steps walked by the user who owns the user terminal 100 using the function of the acceleration sensor. Using the function of the acceleration sensor, the sensor unit 150 may detect motion information indicating whether the user terminal 100 is in motion or stationary or the like at regular intervals or every time the user terminal 100 is operated. In addition, the sensor unit 150 may detect the position of the user terminal 100 using a GNSS (Global Navigation Satellite System). The sensor unit 150 sends the sensing data detected as described above to the processing unit 160.

The sensor unit 150 is an information processing terminal (a so-called wearable terminal) which can be mounted to the user and which is connected to the user terminal 100 so as to be capable of communicating with the user terminal 100 such as a wrist watch-type terminal or a ring-type terminal. The center unit 150 may detect biological data of the user. For example, the sensor unit 150 determines a heart rate of the user by photoplethysmography or the like and sends the heart rate to the processing unit 160 as sensing data. The sensing data detected by the sensor unit 150 is not limited to the above and the sensor unit 150 may detect biological data related to the user's sleep such as breathing, pulse, or body motion.

The processing unit 160 executes various kinds of information processing to be executed in the user terminal 100. The processing unit 160 has a CPU (Central Processing Unit) and a memory. In the user terminal 100, the various kinds of information processing described above are executed by having the CPU use the memory to execute an information processing program stored in the storage unit 140. In the present embodiment, as the information processing described above, the processing unit 160 executes a processing step of calculating a wake-up time, a processing of presenting the user with information related to the progress of the breeding game having been received from the game server 200, and the like. In addition, when the user terminal 100 operates as a multifunctional device, the processing unit 160 executes information processing for realizing the respective functions. Furthermore, the processing unit 160 acquires a present time and date using a system clock.

Based on the sensing data having been sent from the sensor unit 150, the processing unit 160 calculates a wake-up time of the user. In addition, the processing unit 160 instructs the communicating unit 110 to transmit the calculated wake-up time to the game server 200. It should be noted that the wake-up time may be calculated using a function for analyzing sleep that is included in a general multifunctional device such as that described above, or the manner in which the wake-up time is calculated may be configured by a developer of the breeding game or the like. For example, a time at which the user performs an operation to awake the virtual life form in the breeding game may be set as the wake-up time or a time at which an input to the effect of waking up (for example, stopping an announced alarm) to the user terminal 100 from the user is accepted may be set as the wake-up time. As the operation to awake the virtual life form, for example, the virtual life form being displayed on a display may be tapped or the terminal may be shaken. Alternatively, a configuration may be adopted in which the processing unit 160 sends the sensing data having been sent from the sensor unit 150 to the game server 200 via the communicating unit 110 and the game server 200 calculates the wake-up time.

Figure 3:
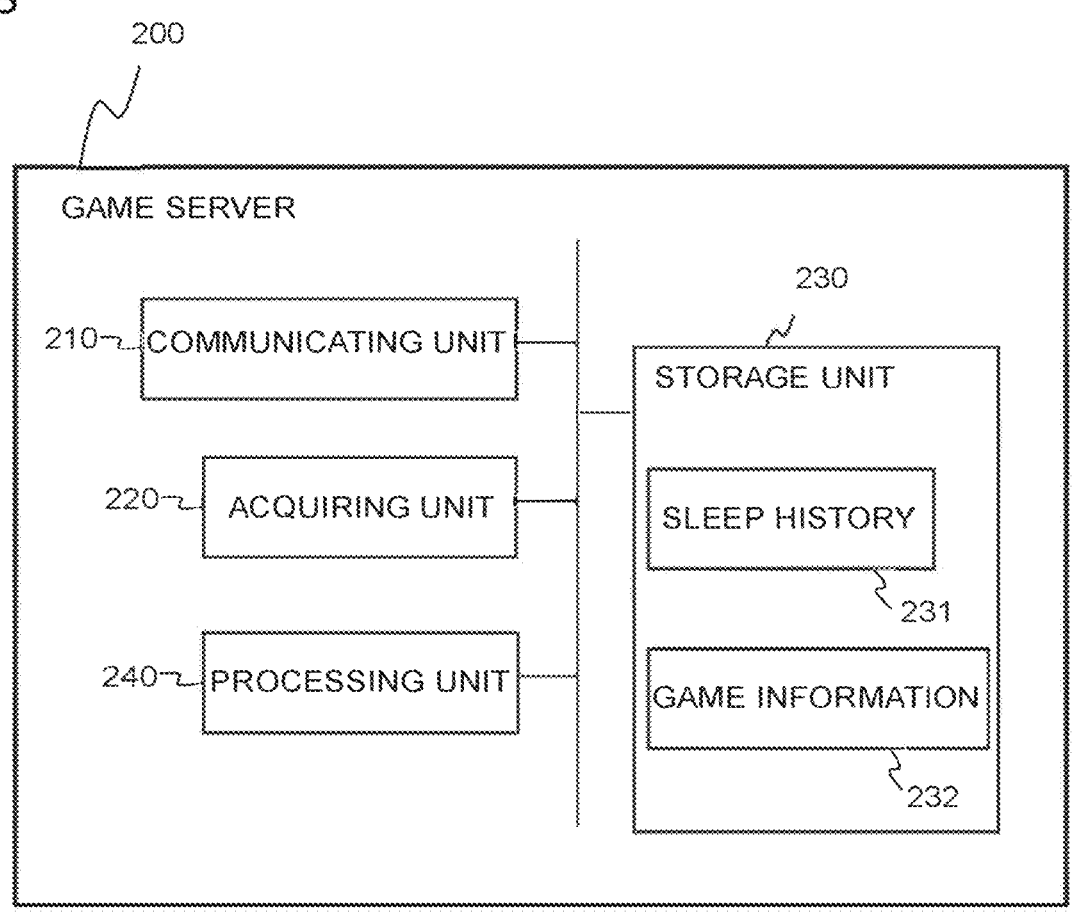
FIG. 3 is a functional block diagram showing an example of a functional configuration of a game server 200.

FIG. 3 is a functional block diagram showing an example of a functional configuration of the game server 200. Alternatively, the game server 200 according to the present embodiment may be configured by omitting a part of components (respective units) shown in FIG. 3.

The game server 200 includes a communicating unit 210, an acquiring unit 220, a storage unit 230, and a processing unit 240.

The communicating unit 210 performs various kinds of control for communicating with the user terminal 100 via the network NW and a function thereof can be realized by hardware such as various kinds of processors or a communication ASIC or by a program or the like.

The acquiring unit 220 acquires a wake-up time having been received by the communicating unit 210 from the user terminal 100 and sends the wake-up time to the storage unit 230.

The storage unit 230 is a storage apparatus for storing a program and various kinds of data that enable a computer to function. The storage unit 230 includes a wake-up history 231 and game information 232.

The wake-up history 231 stores (accumulates) wake-up times of the user acquired by the acquiring unit 220. The game information 232 stores information related to the breeding game of the virtual life form. Alternatively, the storage unit 230 may include a temporary storage area or a storage. In addition, the storage unit 230 may be configured to store sensing data having been received by the communicating unit 210 from the user terminal 100.

The processing unit 240 executes various kinds of information processing to be executed in the game server 200. The processing unit 240 has a CPU and a memory, and various kinds of information processing are executed by having the CPU use the memory to execute an information processing program stored in the storage unit 230. In the present embodiment, as the information processing described above, the processing unit 240 executes processing related to the breeding game based on the wake-up time stored in the wake-up history 231. In addition, the processing unit 240 may execute a processing step related to the breeding game based on various kinds of information having been detected by the user terminal 100. A processing result related to the breeding game is transmitted to the user terminal 100. Alternatively, the processing unit 240 may perform progress processing of the breeding game in accordance with a random number result that corresponds to the acquired wake-up time. Furthermore, the processing unit 240 acquires a present time and date using a system clock.

It should be noted that, in the present embodiment, a "server" is a term that means, in addition to a single information processing apparatus (in other words, a server apparatus), an entire server apparatus group (in other words, a server system) when a server is constituted by a plurality of server apparatuses. In addition, in the present embodiment, while the game server 200 will be described as an integral construction, the game server 200 may be a construction including a plurality of server apparatuses divided according to function and/or role. For example, the game server 200 may be a construction including a data server that stores a wake-up time acquired from the user terminal 100 and a service server that provides a game service based on the wake-up time. Furthermore, when the game server 200 performs a service of providing an item as a part of the game service, the game server 200 may be a construction including a shop server that provides items and performs billing.

Figure 4:
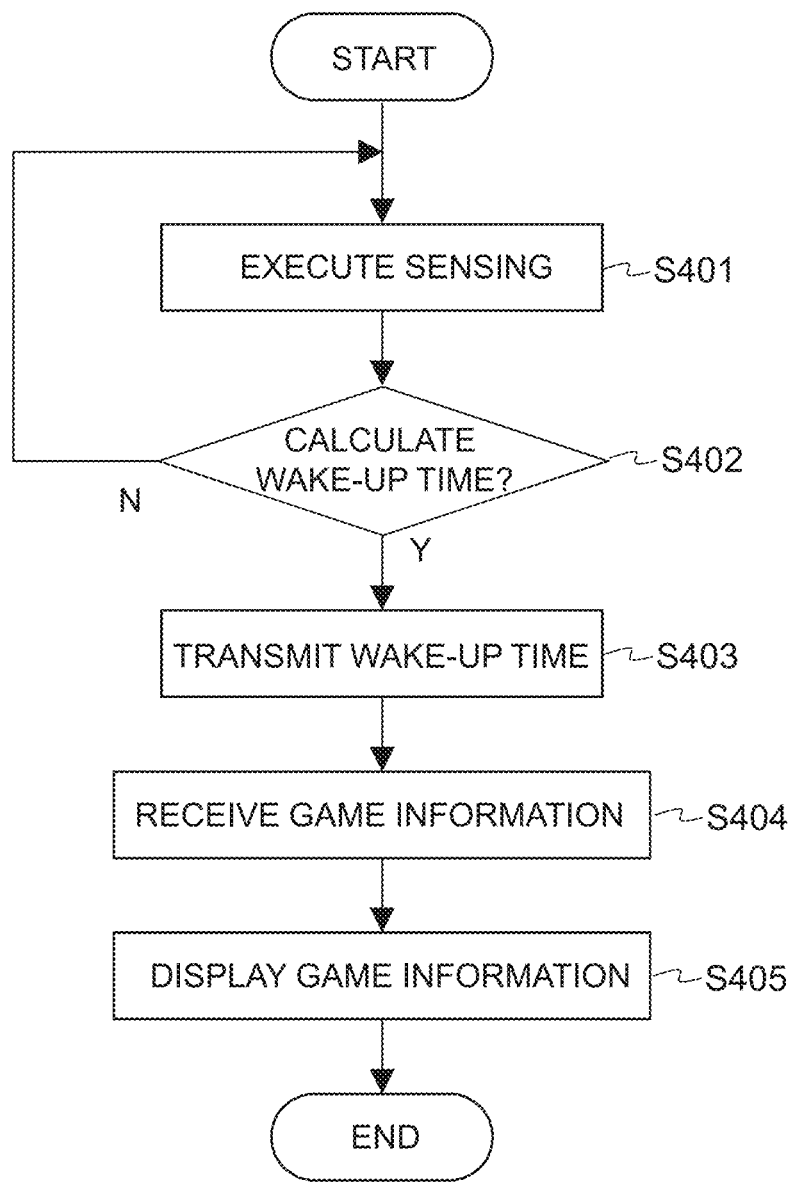
FIG. 4 is a flow chart showing an example of processing in the user terminal 100.

FIG. 4 is a flow chart showing an example of processing in the user terminal 100. An example of processing by the user terminal 100 will be described with reference to FIG. 4. The user terminal 100 may use an input operation by the user to the effect of going to bed as a trigger to start the processing. The input operation by the user to the effect of going to bed may be, for example, an operation of interrupting the breeding game or an operation of putting the virtual life form to sleep (petting the virtual life form, turning off a light in a virtual space being used by the virtual life form, or the like via the touch panel). In addition, sensing can be constantly executed by the sensor unit 150, in which case the user terminal 100 can detect that the user has gone to sleep based on sensing data (for example, a motion of the terminal or brightness or audio in the periphery of the terminal). Furthermore, the user may be prompted to go to bed by showing the virtual life form in a drowsy state or also turning the world inside the game into night as a set time to sleep approaches.

In step S401, the processing unit 160 of the user terminal 100 instructs the sensor unit 150 to execute sensing. Specifically, the sensor unit 150 senses a motion of the user terminal 100 or biological data of the user such as a heart rate. The processing unit 160 acquires sensing data from the sensor unit 150.

In step S402, based on the sensing data having been sent from the sensor unit 150, the processing unit 160 determines whether or not a wake-up time can be calculated. When the processing unit 160 determines that a sufficient amount of sensing data that enables a wake-up time to be calculated has not been acquired (N in step S402), the processing returns to step S401.

Otherwise (Y in step S402), the processing unit 160 calculates a wake-up time and the processing is advanced to step S403. For example, the processing unit 160 may detect a change in altitude of the user terminal 100 based on the sensing data and determine that the user has woken up, and calculate a time at which the change had occurred as the wake-up time. In addition, for example, the processing unit 160 may detect a change in the heart rate of the user terminal 100 based on the sensing data and determine that the user has woken up when the change in the heart rate fits a pattern of the heart rate upon wake-up having been stored in advance, and calculate a time at which the change had occurred as the wake-up time. Alternatively, the processing unit 160 may detect that a virtual life form being displayed on a display is tapped or the terminal is shaken by the user and determine that the user has woken up, and adopt the detected time as the wake-up time. However, the calculation of the wake-up time is not limited to these methods and known calculation methods may be adopted.

In step S403, the processing unit 160 instructs the communicating unit 110 to transmit the calculated wake-up time to the game server 200.

In step S404, the communicating unit 110 receives game information having been transmitted from the game server 200 in accordance with the wake-up time transmitted in step S403 and transmits the game information to the processing unit 160.

In step S405, the processing unit 160 instructs the output unit 130 to output the game information received in step S404 and ends the processing.

Figure 5:
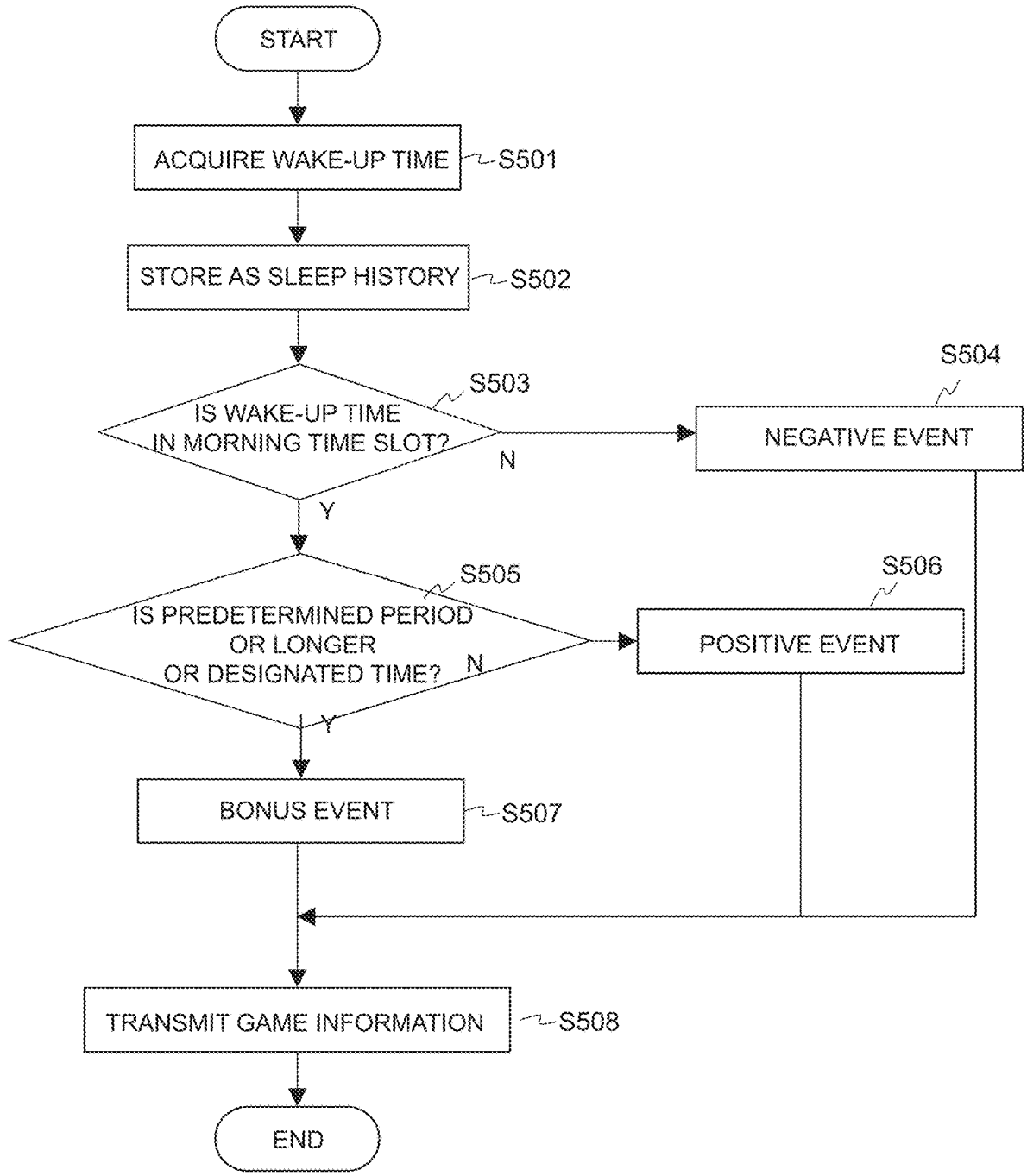
FIG. 5 is a flow chart showing processing in the game server 200.

FIG. 5 is a flow chart showing processing in the game server 200. An example of processing in the game server 200 will be described with reference to FIG. 5. In FIG. 5, the game server 200 uses a reception of a wake-up time from the user terminal 100 as a trigger to start the processing.

In step S501, the acquiring unit 220 of the game server 200 acquires, via the communicating unit 210, a wake-up time of the user having been transmitted from the user terminal 100 and sends the wake-up time to the storage unit 230.

In step S502, the storage unit 230 stores the wake-up time in the wake-up history 231 as a wake-up history.

In step S503, the processing unit 240 determines whether or not the wake-up time acquired in step S501 is a morning time slot. The morning time slot refers to a time at which a person generally becomes active and an example thereof is from around 6 a.m. to around 9 a.m. While the time slot may be arbitrarily set by the user or the developer of the game, the time slot can end at 9 a.m., for example.

Based on the determination on whether or not the wake-up time is the morning time slot, the processing unit 240 determines an event (described in detail in steps S504, S506, and S507) to be generated in the breeding game. This is due to the following reason. It is generally said that human beings have a morning life rhythm and, by waking up in the morning, the life rhythm is adjusted and a favorable state of health is maintained. Therefore, in the present embodiment, the user is motivated to wake up in the morning by causing the game to progress in the morning time slot. By enjoying the game, the user no longer finds it difficult to wake up in the morning but, rather, begins to look forward to waking up in the morning. In addition, by acquiring a morning lifestyle habit, the user can start maintaining good physical conditions.

When the processing unit 240 determines in step S503 that the wake-up time is not the morning time slot (N in step S503), in step S504, the processing unit 240 performs processing for generating a negative event in the breeding game and causes a processing result to be stored in the game information 232 of the storage unit 230. Details of events in the breeding game will be provided later.

On the other hand, when it is determined that the wake-up time is the morning time slot (Y in step S503), in step S505, the processing unit 240 determines whether or not the wake-up time continuously satisfies the morning time slot for a predetermined period or longer based on the wake-up history or whether or not the wake-up time matches a designated time set in advance. The designated time is, for example, a wake-up time set by the user and examples thereof include 7 a.m. and 6:30 a.m. Alternatively, the designated time may have a time width (for example, around 10 minutes).

When it is determined that the wake-up time does not satisfy the morning time slot for a predetermined period or longer based on the wake-up history or that the wake-up time is not the designated time set in advance (N in step S505), in step S506, the processing unit 240 performs processing for generating a positive event in the breeding game and causes a processing result to be stored in the game information 232 of the storage unit 230.

On the other hand, when it is determined that the wake-up time satisfies the morning time slot for a predetermined period or longer based on the wake-up history or that the wake-up time matches the designated time set in advance (Y in step S505), in step S507, the processing unit 240 performs processing for generating a bonus event that differs from a positive event in the breeding game and causes a processing result to be stored in the game information 232 of the storage unit 230.

As the predetermined period, for example, the user may set an arbitrary number of days such as three days or a week. By having the user set the predetermined period for generating a bonus event by himself/herself, the predetermined period can be used as a goal to strive for in terms of continuing a morning life rhythm, and generating a bonus event can impart a sense of achievement to the user.

In addition, the developer of the game may set the predetermined period as an internal parameter of the game. The user can stay motivated toward practicing a morning lifestyle while waiting expectantly for a bonus event to occur and, by generating the bonus event, a sense of surprise as well as a sense of satisfaction can be imparted to the user.

In step S508, the processing unit 240 transmits processing in the game as game information to the user terminal 100 via the communicating unit 210 and ends the processing.

When the sensing data or the like acquired from the user terminal 100 suggests that, conceivably, a problem has occurred in sensing by the user terminal 100 such as a wake-up time not being calculated, the processing unit 240 may assume a wake-up time based on an amount of daytime activity of the user such as the number of steps taken by the user. For example, when the processing unit 240 determines that a problem has occurred in sensing by the user terminal 100, the processing unit 240 acquires sensing data related to the amount of activity of the user from the user terminal 100. In addition, when the amount of activity of the user on a given day is an average amount of activity of the user, an average wake-up time that is calculated based on a previous wake-up history of the user is assumed. Accordingly, even when a problem occurs in the calculation of a wake-up time, implementing such a relief measure prevents the breeding game from progressing in a disadvantageous manner to the user.

In addition, the processing unit 240 may generate a mini-game in addition to generating the respective events described above. Causing the user to play the mini-game prevents the user from falling back to sleep. The mini-game requires the user to perform some kind of task. For example, as an aspect of the mini-game, a game that requires the user to perform an operation that involves actually moving his/her body is preferable such as a mini-game for arousing, playing with, or petting the virtual life form by shaking the terminal itself or tapping or swiping the display or a mini-game that enables the user to capture the virtual life form by standing up and taking a predetermined number of steps. Accordingly, an effect of reliably waking up the user can be expected.

Furthermore, the mini-game may be configured to be played within a predetermined time from a time of occurrence of each event. Providing an incentive such as giving points (to be described later) when the mini-game is completed can be used as motivation to not fall back to sleep.

Figure 6:
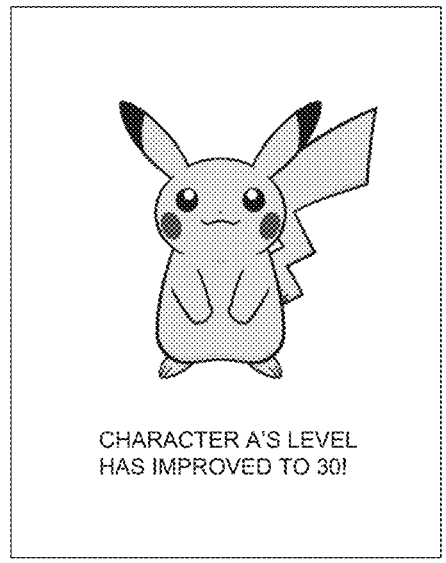
FIG. 6 is a diagram showing an example of a positive event.
Figure 7:
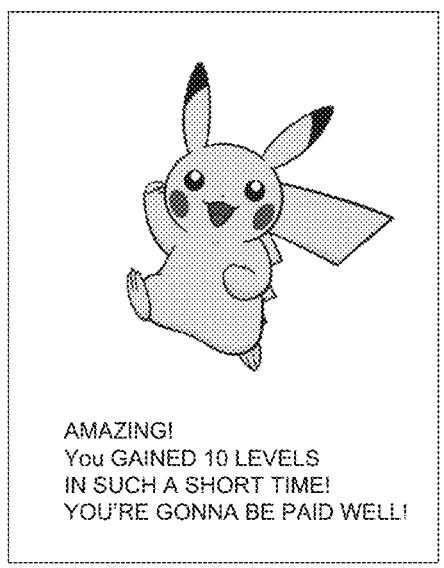
FIG. 7 is a diagram showing an example of a bonus event.
Figure 8:
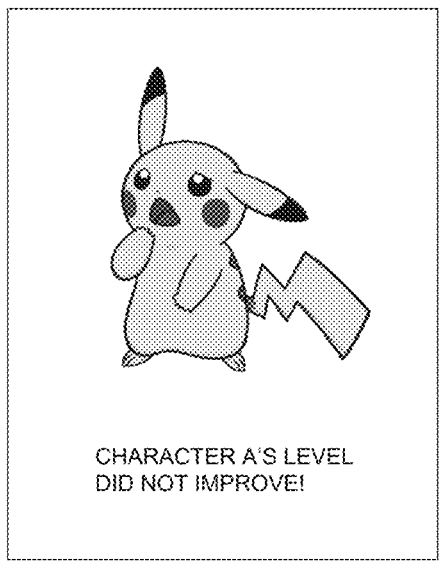
FIG. 8 is a diagram showing an example of a negative event.

FIGS. 6 to 8 are diagrams for explaining examples of events in the breeding game. Examples of a positive event, a bonus event, and a negative event in the breeding game will now be described with reference to FIGS. 6 to 8. The processing unit 240 may be configured to change contents of each event in accordance with a random number result that corresponds to the acquired wake-up time.

FIG. 6 is a diagram showing an example of a positive event. The positive event refers to an event for causing the breeding game to progress in an advantageous manner which occurs when the wake-up time of the user is the morning time slot. For example, the positive event can be one or more of an event that enables the virtual life form to grow, an event for adding points related to the virtual life form, and an event for giving items or privileges in the breeding game.

Examples of enabling the virtual life form to grow include, but are not limited to, making the virtual life form appear larger, making the virtual life form appear stronger, making the virtual life form more beautiful or handsome, causing the virtual life form to change from a child to an adult, causing the virtual life form to evolve, and causing the virtual life form to mature internally.

In addition, the points may be experience points of the virtual life form or in-game currency for purchasing items in the game. Based on a value of the points, a level of the virtual life form may be determined or various virtual life forms may be introduced. The positive event can provide the user with an incentive toward waking up in the morning time slot.

In FIG. 6, a character A that is a virtual life form acquires experience points (which correspond to points) and improves its level (which corresponds to growing) in accordance with the wake-up time of the user being the morning time slot. In other words, the character A grows when the user wakes up in the morning time slot. Accordingly, by practicing a morning life rhythm, the user can grow the character A and enjoy the breeding game.

FIG. 7 is a diagram showing an example of a bonus event. The bonus event refers to an event for causing the breeding game to progress in a particularly advantageous manner which occurs when the wake-up time stored in the wake-up history is included in the morning time slot for a predetermined period or longer or when the wake-up time is the designated time set in advance. Examples of the bonus event include, but are not limited to, an event for facilitating the growth of the virtual life form, an event for adding points related to the virtual life form as a bonus, and an event for giving items or privileges that cause the breeding game to progress in an advantageous manner. For example, another aspect of the bonus event is an event in which the character leaves a new virtual life form with the user for the user to grow. By growing the virtual life form on the character's behalf, the user can receive a message of gratitude from the character or be awarded points or the like.

In addition, the user may be notified of an occurrence of the bonus event in advance. This can be used as motivation to continuously stick to the reference sleep pattern. Expectations of the user toward an occurrence of the bonus event can be built up by notifying the user of, for example, an introduction of a new virtual life form, addition of points, or the like on the following Sunday. The bonus event can provide the user with an incentive toward continuously waking up in the morning for a predetermined period or longer or waking up at the designated time. In addition, the bonus event can be generated only within a predetermined time (for example, several minutes such as five minutes) from the designated time to prompt the user to wake up at the designated time and enable sufficient awakening.

In FIG. 7, in accordance with the wake-up time stored in the wake-up history being included in the morning time slot for a predetermined period or longer or the wake-up time being the designated time set in advance, the virtual life form acquires experience points in an amount equal to or greater than an amount acquired by a positive event and improves its level significantly. In addition, an item (a reward) that causes the breeding game to progress in an advantageous manner is awarded. The item is endowed with a special effect such as making the level of the virtual life form more easily improved or causing other virtual life forms to appear when the item is used to put the virtual life form to sleep.

FIG. 8 is a diagram showing an example of a negative event. The negative event refers to an event for causing the breeding game to progress in a disadvantageous manner which occurs when the wake-up time of the user is not included in the morning time slot. Examples of the negative event include, but are not limited to, stopping the growth of the virtual life form, causing the virtual life form to devolve, making the virtual life form weaker, and subtracting points related to the virtual life form. For example, as another aspect of the negative event, when the wake-up time of the user is not included in the morning time slot, a rate of breeding may be made slower by making the virtual life form appear to be drowsy during the day or the like. In other words, when the user oversleeps, growth of the virtual life form is inhibited as long as the user stays awake. The negative event can cause the user to become conscious of waking up in the morning.

In FIG. 8, the character A that is a virtual life form is unable to acquire experience points and its level is not improved in accordance with the wake-up time of the user not being included in the morning time slot. In addition, the character A may be endowed with a special effect causing the character A to appear out of sorts by consuming (subtracting) points indicating a degree of health or a vitality level related to the character A.

As described above, processing related to the breeding game is executed as shown in, for example, FIGS. 6 to 8 based on a wake-up pattern.

In the breeding game, a degree of difficulty may be set to putting the virtual life form to sleep. For example, at the start of the breeding game, a virtual life form of which a degree of difficulty of putting the virtual life form to sleep is low may be bred and a level of the virtual life form may be set so as to be readily improvable. Accordingly, the breeding game can be readily enjoyed and can lead to a well-regulated lifestyle.

In addition, the degree of difficulty of putting the virtual life form to sleep may be increased as the breeding game progresses. In other words, since it becomes difficult to improve the level of the virtual life form, the user can be made conscious of causing an occurrence of a positive event or a bonus event for improving the level and the user can be prompted to continue a well-regulated lifestyle.

Furthermore, game characteristics may be enhanced by having the user breed a plurality of virtual life forms and setting a degree of difficulty of putting one of the virtual life forms to sleep so as to affect a degree of difficulty of putting another virtual life form to sleep. For example, when the user stays up until late at night (in other words, past a predetermined time), a virtual life form of which a degree of difficulty of putting the virtual life form to sleep is high is introduced and the virtual life form that is being bred is made less susceptible to falling asleep (in other words, a degree of difficulty of putting the virtual life form to sleep is increased). Since the introduction of a virtual life form of which a degree of difficulty of putting the virtual life form to sleep is high causes the degree of difficulty of putting the virtual life form that is currently being bred to sleep to increase, the user can be made conscious toward going to bed earlier (in other words, before the predetermined time). Accordingly, the user can continuously enjoy the game and, by extension, the user can be motivated to continue a well-regulated lifestyle.

DESCRIPTION OF ADVANTAGEOUS EFFECT

The game system according to the present embodiment executes processing steps related to a breeding game in accordance with a wake-up time of a user. Since waking up in the morning leads to breeding a virtual life form, the user can stay motivated to practicing a morning lifestyle while enjoying the breeding game. It is generally said that human beings have a morning life rhythm and, by waking up in the morning, the life rhythm is adjusted and a favorable state of health is maintained. Therefore, in the present embodiment, the user is motivated to wake up in the morning by causing the game to progress in the morning time slot. By enjoying the game, the user no longer finds it difficult to wake up in the morning but, rather, begins to look forward to waking up in the morning. In other words, the user can be encouraged to acquire a morning lifestyle habit and maintain good physical conditions.

In addition, the game system according to the present embodiment generates various events in the breeding game in accordance with the wake-up time. Generating different events enables the user to enjoy the game without becoming bored and, at the same time, an incentive towards practicing a morning lifestyle can be imparted to the user.

Modification

In the game system 1, when a time of day at which an input with respect to the breeding game is accepted is a night time slot, processing in the breeding game that corresponds to the input may be suspended and the suspended processing step may be executed upon waking up in the morning. By preventing the breeding game from progressing at night, the user can be prompted to go to bed early, and by executing the processing suspended at night in the morning, the user can be motivated to wake up in the morning.

Figure 9:
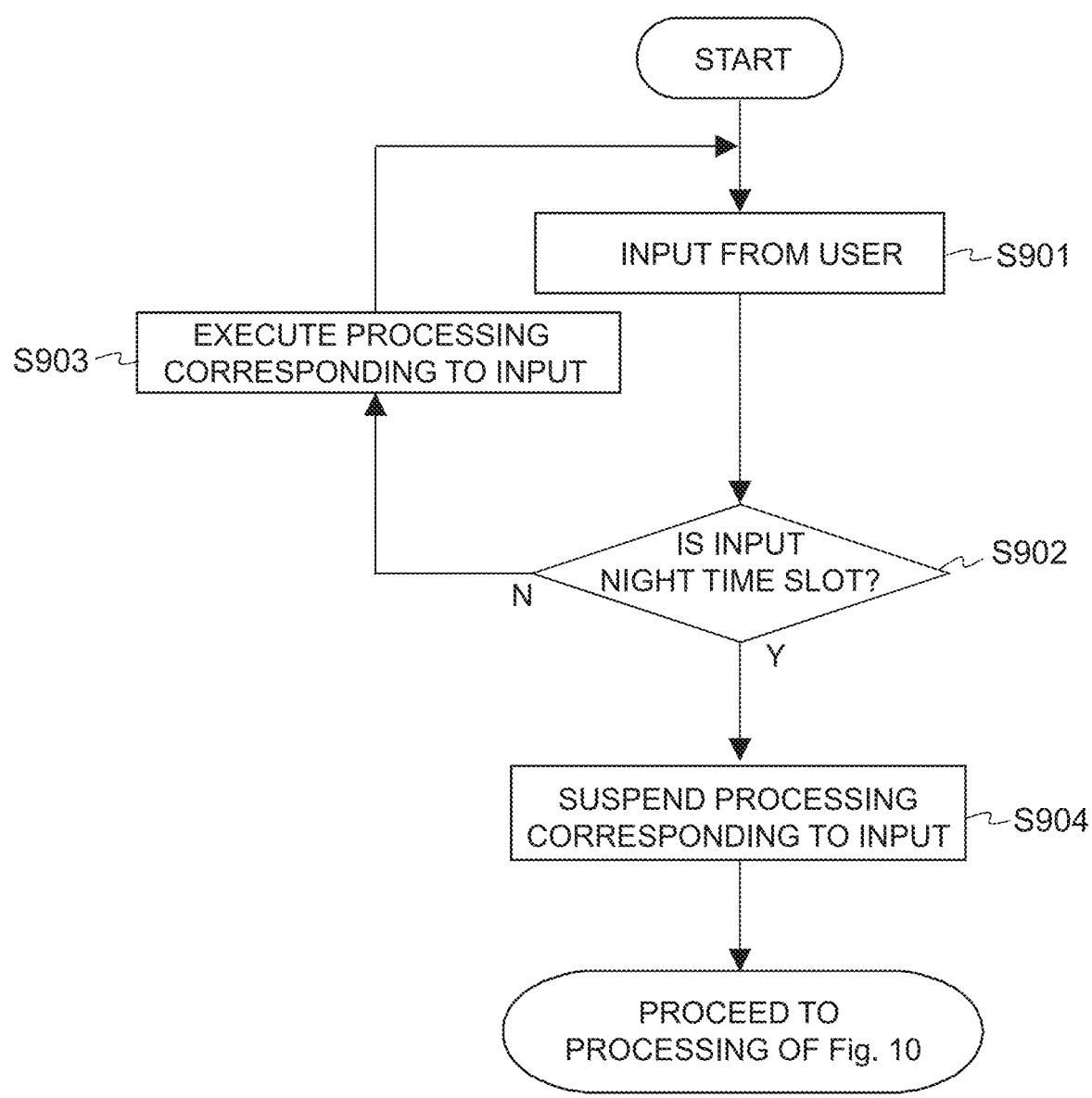
FIG. 9 is a flow chart showing a modification of processing in the game server 200.
Figure 10:
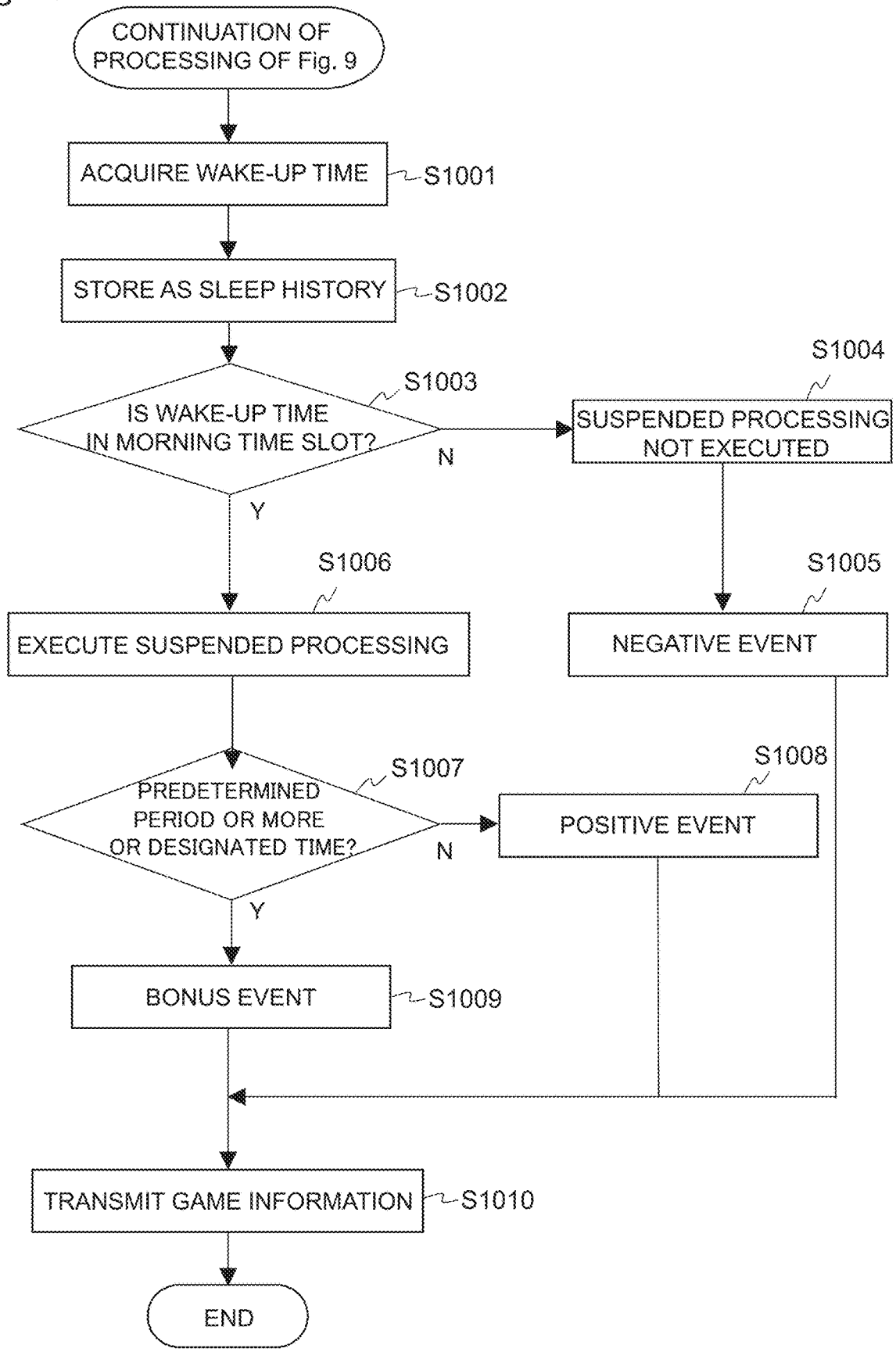
FIG. 10 is a flow chart showing a modification of processing in the game server 200.

FIGS. 9 and 10 are flow charts showing a modification of processing in the game server 200. The modification of the processing in the game server 200 will be described with reference to FIGS. 9 and 10. In FIG. 9, the game server 200 uses a reception of an input with respect to the breeding game by the communicating unit 210 from the user terminal 100 as a trigger and starts the processing.

In step S901, the acquiring unit 220 of the game server 200 acquires, via the communicating unit 210, the user's input with respect to the breeding game having been transmitted from the user terminal 100 and sends the input to the processing unit 240.

In step S902, the processing unit 240 determines whether or not the time of day at which the input had been acquired is a night time slot. The night time slot refers to a time at which a person generally ceases to be active and an example thereof is after 9 p.m. and before 6 a.m. the following morning (in other words, before the morning time slot). While the time slot may be arbitrarily set by the user or the developer of the game, the time slot is can be set in consideration of a minimum sleep time in accordance with the user's age and state of health.

When the processing unit 240 determines that the input is not the night time slot (N in step S902), in step S903, the processing unit 240 executes a processing step that corresponds to the input in the breeding game. In addition, the processing result is caused to be stored in the game information 232 of the storage unit 230 and transmitted to the user terminal 100 via the communicating unit 210.

On the other hand, when the processing unit 240 determines that the input is the night time slot (Y in step S902), in step S904, the processing unit 240 suspends processing corresponding to the input in the breeding game. For example, the processing corresponding to the input is temporarily stored in the storage unit 230. Subsequently, the processing proceeds to step S1001 in FIG. 10. (In FIG. 10, processing other than the processing of steps S1004 and S1006 is the same as the processing described with reference to FIG. 5).

In step S1001 in FIG. 10, the acquiring unit 220 of the game server 200 acquires, via the communicating unit 210, a wake-up time of the user having been transmitted from the user terminal 100 and sends the wake-up time to the storage unit 230.

In step S1002, the storage unit 230 stores the wake-up time in the wake-up history 231 as a wake-up history.

In step S1003, the processing unit 240 determines whether or not the wake-up time acquired in step S1001 is a morning time slot. When the processing unit 240 determines that the wake-up time is not the morning time slot (N in step S1003), in step S1004, the processing unit 240 performs processing for presenting the user terminal 100 of the fact that the processing step having been suspended in step S904 in FIG. 9 will not be executed.

Next, in step S1005, the processing unit 240 performs processing for generating a negative event in the breeding game and causes a processing result to be stored in the game information 232 of the storage unit 230.

On the other hand, when the processing unit 240 determines that the wake-up time is the morning time slot (Y in step S1003), in step S1006, the processing unit 240 executes the processing step having been suspended in step S904 in FIG. 9 and causes a processing result to be stored in the game information 232 of the storage unit 230.

In step S1007, the processing unit 240 determines whether or not the wake-up time continuously satisfies the morning time slot for a predetermined period or longer based on the wake-up history or whether or not the wake-up time matches a designated time set in advance.

When it is determined that the wake-up time does not satisfy the morning time slot for a predetermined period or longer based on the wake-up history or that the wake-up time does not match the designated time set in advance (N in step S1007), in step S1008, the processing unit 240 performs processing for generating a positive event in the breeding game and causes a processing result to be stored in the game information 232 of the storage unit 230.

On the other hand, when it is determined that the wake-up time satisfies the morning time slot for a predetermined period or longer based on the wake-up history or that the wake-up time matches the designated time set in advance (Y in step S1007), in step S1009, the processing unit 240 performs processing for generating a bonus event that differs from a positive event in the breeding game and causes a processing result to be stored in the game information 232 of the storage unit 230.

In step S1010, the processing unit 240 transmits processing in the game as game information to the user terminal 100 via the communicating unit 210 and ends the processing.

As described above, in the game system 1 that represents a modification of the first embodiment, when a time of day at which an input with respect to the breeding game is accepted is a night time slot, processing in the breeding game that corresponds to the input is suspended and the suspended processing step is executed upon waking up in the morning. By preventing the breeding game from progressing at night, the user can be prompted to go to bed early, and by executing the processing suspended at night in the morning, the user can be motivated to wake up in the morning.

Second Embodiment

A user terminal 300 according to a second embodiment executes a game program stored in a storage unit to cause a user to play a breeding game of a virtual life form based on a wake-up time of the user. A configuration may be adopted in which the game program stored in the user terminal can be updated via a network or a storage medium.

Figure 11:
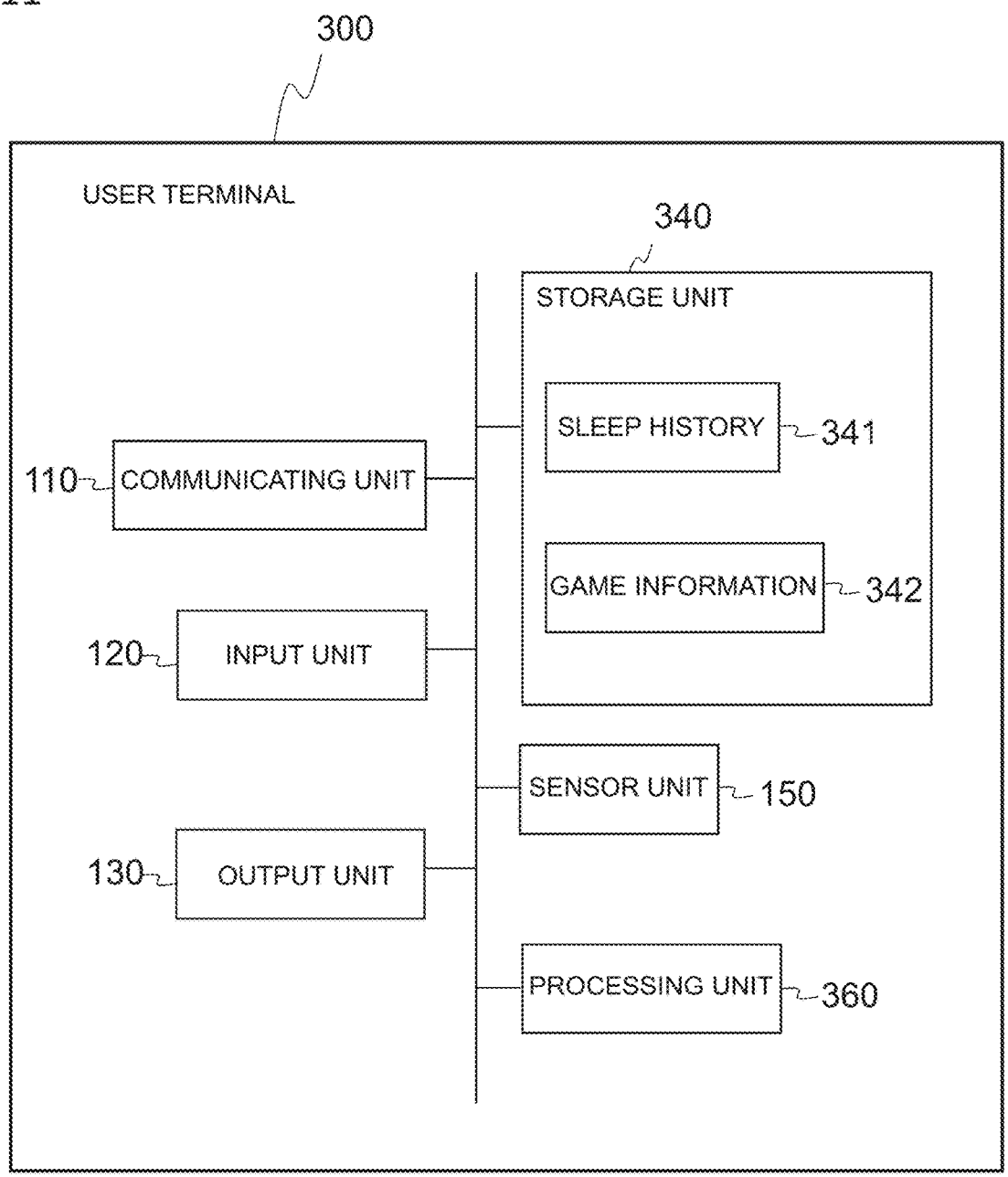
FIG. 11 is a functional block diagram showing an example of a functional configuration of a user terminal 300.

FIG. 11 is a functional block diagram showing an example of a functional configuration of the user terminal 300. The user terminal 300 according to the second embodiment corresponds to an information processing terminal and differs in configuration from the user terminal 100 according to the first embodiment (refer to FIG. 2) in that the user terminal 300 includes a storage unit 340 and a processing unit 360. However, since other components denoted by same reference signs have common functions, repetitive descriptions thereof will be omitted. Alternatively, the user terminal 300 according to the present embodiment may be configured by omitting a part of components (respective units) shown in FIG. 11.

The storage unit 340 is a storage apparatus for storing a program and various kinds of data that cause a computer to function. The storage unit 340 includes a wake-up history 341 and game information 342.

The wake-up history 341 stores (accumulates) wake-up times of the user calculated by the processing unit 360 to be described later. The game information 342 stores information related to the breeding game of the virtual life form. Alternatively, the storage unit 340 may include a temporary storage area or a storage. In addition, the storage unit 340 may be configured to store sensing data having been detected by the sensor unit 150.

The processing unit 360 executes various kinds of information processing to be executed in the user terminal 300. The processing unit 360 has a CPU and a memory, and various kinds of information processing are executed by having the CPU use the memory to execute an information processing program stored in the storage unit 340. In the present embodiment, as the information processing described above, the processing unit 360 executes a processing step of calculating a wake-up time and a processing step related to the breeding game based on the wake-up time. In addition, the processing unit 360 may execute a processing step related to the breeding game based on various kinds of information having been detected by the sensor unit 150. A processing result related to the breeding game is output to the output unit 130. Alternatively, the processing unit 360 may perform progress processing of the breeding game in accordance with a random number result that corresponds to the calculated wake-up time. Furthermore, the processing unit 360 acquires a present time and date using a system clock.

As described above, the user terminal according to the present embodiment can provide a breeding game of a virtual life form based on a wake-up time of a user. Accordingly, the user can enjoy the breeding game even in an environment in which the user is unable to connect to a game server via a network.

The embodiments described above can be implemented in various other forms, and various omissions, replacements, and modifications can be made without departing from the gist of the disclosure. It is to be understood that such embodiments and modifications thereof are included in the scope and gist of the disclosure and are also included in the disclosure as set forth in the claims and the equivalents thereof.

In addition, as a program (software means) that can be executed by a computer, the methods described in the embodiments presented above can be stored in a storage medium such as magnetic disk (a flexible disk, a hard disk, or the like), an optical disc (a CD-ROM, a DVD, an MO, or the like), or a semiconductor memory (a ROM, a RAM, a flash memory, or the like) and can be distributed by being transmitted from a communication medium. The program stored in the medium includes a configuration program that constructs, inside a computer, software means (also including tables and data structures in addition to an executable program) to be executed by the computer. The computer that realizes the present server reads the program stored in the storage medium and, in some cases, constructs the software means using the configuration program, and executes the processing steps described earlier by having the software means control operations. It should be noted that the term "storage medium" as used in the present specification is not limited to those intended to be distributed and also includes storage media such as a magnetic disk and a semiconductor memory provided inside the computer or in a device being connected via a network.

What is claimed is:

1. An information processing apparatus that manages progress of a game to be executed on a user terminal, the information processing apparatus comprising:
   circuitry configured to
      acquire sleep information of a user,
      perform a process of the game based on the sleep information,
      store information of a plurality of characters,
      store a type of notification mode associated with a type of voice for each of the plurality of characters, and
      control the user terminal to perform a notification prompting the user to wake up with a type of notification mode associated with a second character that is different from a first character, the first character being selected in the game before going to bed.

2. The information processing apparatus according to claim 1, wherein the circuitry is further configured to
   control the user terminal to perform the notification at a predetermined time set by the user.

3. A non-transitory computer readable storage medium including computer program instructions for managing progress of a game to be executed on a user terminal, which when executed by an information processing system, cause the system to:
   acquire sleep information of a user,
   perform a process of the game based on the sleep information,
   store information of a plurality of characters,
   store a type of notification mode associated with a type of voice for each of the plurality of characters, and
   control the user terminal to perform a notification prompting the user to wake up with a type of notification mode associated with a second character that is different from a first character, the first character being selected in the game before going to bed.

4. A method of managing progress of a game to be executed on a user terminal, comprising:
   acquiring sleep information of a user;
   performing a process of the game based on the sleep information;
   storing information of a plurality of characters;
   storing a type of notification mode associated with a type of voice for each of the plurality of characters; and
   controlling the user terminal to perform a notification prompting the user to wake up with a type of notification mode associated with a second character that is different from a first character, the first character being selected in the game before going to bed.

5. A game system including a game server that manages progress of a game and being coupled with a user terminal via a network, comprising:
   circuitry configured to
      acquire sleep information of a user,
      perform a process of the game based on the sleep information,
      store information of a plurality of characters,
      store a type of notification mode associated with a type of voice for each of the plurality of characters, and
      control the user terminal to perform a notification prompting the user to wake up with a type of notification mode associated with a second character that is different from a first character, the first character being selected in the game before going to bed.

* * * * *